United States Patent
Odum

(10) Patent No.: US 11,851,796 B2
(45) Date of Patent: Dec. 26, 2023

(54) CARPET PRODUCTS AND METHODS OF MAKING SAME

(71) Applicant: COLUMBIA INSURANCE COMPANY, Omaha, NE (US)

(72) Inventor: Tom Odum, Tunnel Hill, GA (US)

(73) Assignee: COLUMBIA INSURANCE COMPANY, Omaha, NE (US)

(*) Notice: Subject to any disclaimer, the term of this patent is extended or adjusted under 35 U.S.C. 154(b) by 26 days.

(21) Appl. No.: 16/806,349

(22) Filed: Mar. 2, 2020

(65) Prior Publication Data

US 2020/0199798 A1 Jun. 25, 2020

Related U.S. Application Data

(62) Division of application No. 15/428,606, filed on Feb. 9, 2017, now abandoned.

(Continued)

(51) Int. Cl.
*D06C 25/00* (2006.01)
*D05C 15/16* (2006.01)
(Continued)

(52) U.S. Cl.
CPC ......... *D06C 25/00* (2013.01); *A47G 27/0268* (2013.01); *B32B 3/02* (2013.01);
(Continued)

(58) Field of Classification Search
CPC ...... D05C 17/026; D05C 25/00; D05C 29/00; Y10T 428/23929; A47G 27/0268;
(Continued)

(56) References Cited

U.S. PATENT DOCUMENTS 3,074,835 A * 1/1963 Gordon .............. A47G 27/0268
428/88
3,221,685 A * 12/1965 Greenberg ........... D05B 23/005
112/138

(Continued)

FOREIGN PATENT DOCUMENTS

BE 788003 A * 2/1973 ............. D06C 25/00
DE 1113203 B * 8/1961 ......... A47G 27/0268
(Continued)

OTHER PUBLICATIONS

DE 1113203 B, EPO translation.of Description of reference. (Year: 1961).*

(Continued)

*Primary Examiner* — Cheryl Juska
(74) *Attorney, Agent, or Firm* — BALLARD SPAHR LLP

(57) ABSTRACT

A carpet product including a primary backing layer and a plurality of yarn tufts. The plurality of yarn tufts are tufted in and extend upwardly from a top surface of the primary backing layer to form a tufted carpet product. The carpet product has an inner portion and a peripheral portion surrounding at least a portion of the inner portion and extending along at least one of the edges of the primary backing layer. The plurality of yarn tufts include a plurality of peripheral yarn tufts positioned within the peripheral portion of the tufted carpet product. A portion of the peripheral yarn tufts are anchored to other peripheral yarn tufts. At least a portion of each anchored peripheral yarn tuft is entangled with one or more of the other peripheral yarn tufts.

17 Claims, 7 Drawing Sheets

Related U.S. Application Data

(60) Provisional application No. 62/292,941, filed on Feb. 9, 2016.

(51) Int. Cl.
*B32B 3/02* (2006.01)
*D05C 17/02* (2006.01)
*D06C 29/00* (2006.01)
*D05C 15/00* (2006.01)
*A47G 27/02* (2006.01)

(52) U.S. Cl.
CPC ............. *D05C 15/00* (2013.01); *D05C 15/16* (2013.01); *D05C 17/026* (2013.01); *D06C 29/00* (2013.01); *D10B 2503/042* (2013.01); *Y10T 428/23929* (2015.04)

(58) Field of Classification Search
CPC ...... D10B 2503/04; B32B 3/02; D06C 25/00; D06C 29/00
See application file for complete search history.

(56) References Cited

U.S. PATENT DOCUMENTS

| | | | |
|---|---|---|---|
| 3,402,094 A * | 9/1968 | Levitch | B32B 27/00 428/40.4 |
| 3,751,777 A | 8/1973 | Turmel | |
| 3,900,623 A | 8/1975 | Hatt | |
| 5,532,035 A | 7/1996 | Corbin | |
| 2002/0029515 A1 | 3/2002 | Prevost | |
| 2003/0036337 A1 | 2/2003 | Lemieux | |
| 2003/0207071 A1 | 11/2003 | Beistline | |
| 2008/0124496 A1 | 5/2008 | Avery | |
| 2009/0208674 A1 | 8/2009 | Murphy | |
| 2014/0115999 A1 | 5/2014 | Murphy | |
| 2014/0205788 A1 | 7/2014 | Roelens | |
| 2017/0334101 A1 * | 11/2017 | Mooney | B29C 39/38 |

FOREIGN PATENT DOCUMENTS

| | | | | |
|---|---|---|---|---|
| EP | 0520891 | A1 * | 12/1992 | ......... B29C 67/0044 |
| FR | 2185710 | A1 * | 1/1974 | ............ D06C 25/00 |
| JP | 63281606 | A  * | 11/1988 | |
| JP | 2007056400 | A  * | 3/2007 | ............ D06C 25/00 |
| JP | 2008031582 | A  * | 2/2008 | ......... A47G 27/0268 |
| JP | 2008274467 | A  * | 11/2008 | |

OTHER PUBLICATIONS

FR 2185710 A1, EPO translation.of Description of reference. (Year: 1974).*

JP 63-281606 A, JPO translation. (Year: 1988).*

* cited by examiner

CARPET PRODUCTS AND METHODS OF MAKING SAME

CROSS-REFERENCE TO RELATED APPLICATIONS

This application is a division of U.S. patent application Ser. No. 15/428,606, filed Feb. 9, 2017, which claims priority to and the benefit of U.S. Provisional Patent Application Ser. No. 62/292,941, filed Feb. 9, 2016, each of which is hereby incorporated by reference herein in its entirety.

FIELD

The disclosed invention relates to carpet products and methods of using such carpet products. In exemplary aspects, the disclosed invention relates to carpet products having anchored peripheral yarn tufts that are entangled with one or more vertical peripheral yarn tufts.

BACKGROUND

When an initial tile cutting manufacturing process is complete, the base edge is straight and a free of stray tufted face fibers with all face fibers standing in an erect position or substantially perpendicular to the backing and floor. Above the base, the tufted carpet fiber can be easily moved and pressed laterally into the area where there is no backing under the fibers, and these fibers can be trapped under adjacent tiles when installed with other tiles with the same or similar tufting construction.

Conventional carpet manufacturing methods and systems have historically produced carpet products with unsecured edge carpet fibers along the perimeter of the carpet products, as shown in FIGS. 1A and 1B. Such edge carpet fibers have historically been easily moved and pressed laterally into an area where there is no backing underneath the fibers, particularly during shipping and handling of the carpet products. Movement of these unsecured edge carpet fibers in an undesirable position, often parallel to the backing and extending away from the center of the carpet product, can cause the edge fibers to become trapped underneath adjacent carpet products during installation with other carpet products having the same or similar tufting construction.

To reduce the entrapment of these edge carpet fibers underneath adjacent carpets, carpet products conventionally have been beveled and/or sheared to remove the fibers from the edges. However, these methods do not prevent movement of the carpet fibers during the period of shipment or transport of the carpet product to the site of installation. Thus, such methods require the carpet installer to have the proper equipment ready for beveling and/or shearing and to invest considerable time and effort into cutting the edge carpet fibers on-site, which ultimately reduces efficiency and delays the installation process. Additionally, as pile height increases, the probability of trapping fiber on the edges increases. The instance of trapped fibers generally more severe when the pile height of the tufted fiber is greater than ⅜" and is a cut pile carpet. Trapped fiber under the edge can prevent tiles from completely fitting together at the seam, which can cause out of square conditions, puckers and bumps at the seams in the finished carpet after installation.

Thus, there is a need for carpet products having secured edge fibers along the perimeter edges of the carpet product. There is a further need for methods and systems of securing the edge carpet fibers in an upright position to reduce the likelihood of the fibers being pressed into an undesirable position during the period of shipment and installation of the carpet product, thereby improving the overall quality of the installation process.

SUMMARY

Described herein, in various aspects, is a carpet product including a primary backing layer and a plurality of yarn tufts. The primary backing layer can have a top surface and a plurality of edges. The plurality of yarn tufts can be tufted in and extend upwardly from the top surface of the primary backing layer to form a tufted carpet product. The tufted carpet product can have an inner portion and a peripheral portion surrounding at least a portion of the inner portion and extend along at least one of the edges of the primary backing layer. The plurality of yarn tufts can include a plurality of peripheral yarn tufts positioned within the peripheral portion of the tufted carpet product. The plurality of peripheral yarn tufts can include a first plurality of peripheral yarn tufts and a second plurality of peripheral yarn tufts. The first plurality of peripheral yarn tufts are anchored to the second plurality of peripheral yarn tufts. At least a portion of each anchored peripheral yarn can be entangled with one or more of the peripheral yarn tufts of the second plurality of peripheral yarn tufts.

In other aspects, described herein is a carpet product including a primary backing layer and a plurality of yarn tufts. The primary backing layer can have a top surface and a plurality of edges. The plurality of yarn tufts can be tufted in and extend upwardly from the top surface of the primary backing layer to form a tufted carpet product. The tufted carpet product can have an inner portion and a peripheral portion surrounding at least a portion of the inner portion and extend along at least one of the edges of the primary backing layer. The plurality of yarn tufts can include a plurality of peripheral yarn tufts positioned within the peripheral portion of the tufted carpet product. The plurality of peripheral yarn tufts can include a first plurality of peripheral yarn tufts and a second plurality of peripheral yarn tufts. The yarn tufts of the first plurality of peripheral yarn tufts are anchored to one or more yarn tufts of the second plurality of peripheral yarn tufts. At least a portion of each anchored peripheral yarn can be entangled with one or more of the peripheral yarn tufts of the second plurality of peripheral yarn tufts. The entanglement of peripheral yarn tufts can ensure that no peripheral yarn extends radially beyond a reference plane that is positioned at a selected angle relative to a vertical plane that is substantially perpendicular or perpendicular to the primary backing layer. Optionally, the selected angle can be less than about 40 degrees.

Disclosed herein, in further aspects, is a method that includes displacing a first plurality of peripheral yarn tufts of a tufted carpet product in an inward direction to entangle a second plurality of peripheral yarn tufts of the tufted carpet product. Each of the peripheral yarn tufts can be tufted in and extend upwardly from a top surface of a primary backing layer of the tufted carpet product. The entanglement of the yarn tufts of the first plurality of peripheral yarn tufts with the yarn tufts of the second plurality of peripheral yarn tufts anchors the first plurality of peripheral yarn tufts in a desired orientation relative to the primary backing layer.

DESCRIPTION OF THE DRAWINGS

FIG. 1A displays a conventional carpet product having unsecured edge carpet fibers. FIG. 1B displays a conventional carpet product having trapped fibers at the tile seam.

DETAILED DESCRIPTION

Figure 1A:
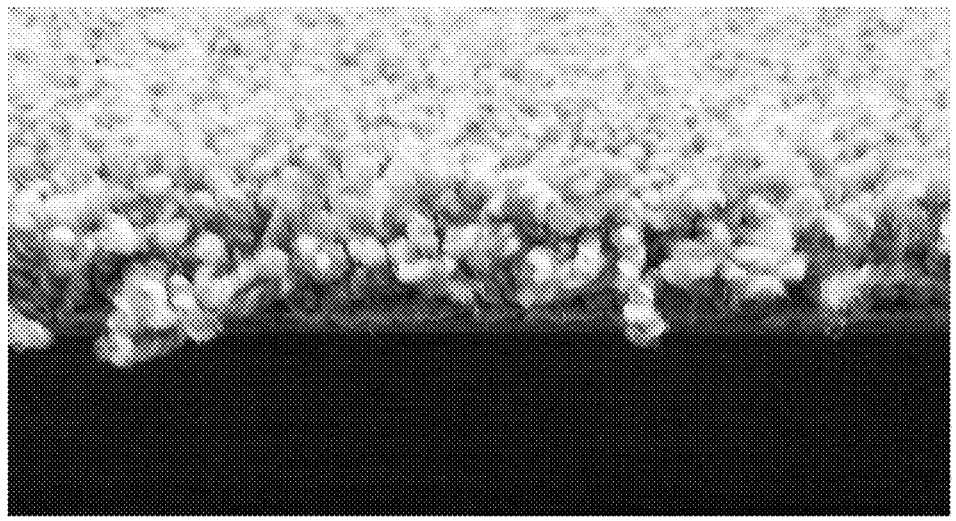
FIGS. 1A-1B display exemplary conventional carpet products.
Figure 1B:
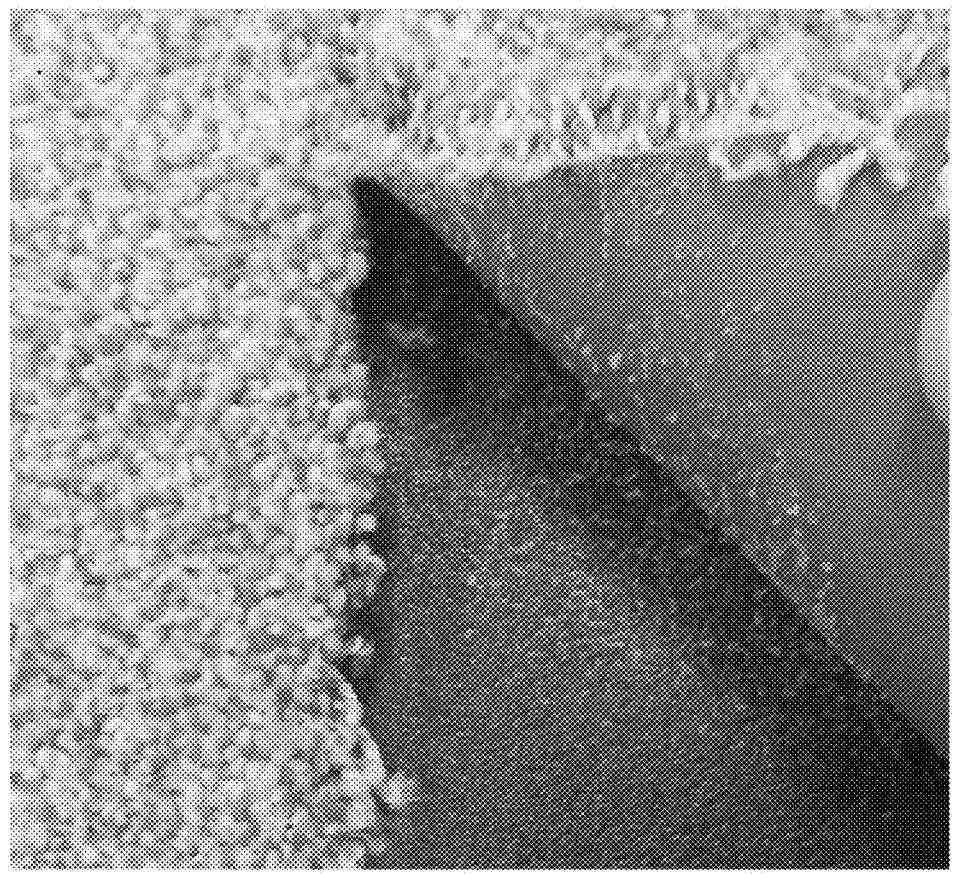

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a", "an", and "the" include plural referents unless the context clearly dictates otherwise. For example, use of the term "a fiber" can refer to one or more of such fibers.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

Disclosed herein, in various aspects and with reference to FIGS. 1-8C, are carpet products 10 and methods of making such carpet products. In exemplary aspects, the carpet product 10 can be a broadloom carpet. In other exemplary aspects, the carpet product can be a carpet tile. However, it is contemplated that the carpet product 10 can comprise any conventional carpet product, including, for example and without limitation, bulk continuous fiber carpet products, spun carpet products, turf products, rugs, patches, and the like. As further described herein, the carpet products can have edge fibers that are secured to prevent and/or limit fibers extending beyond an edge of the carpet product.

Figure 2:
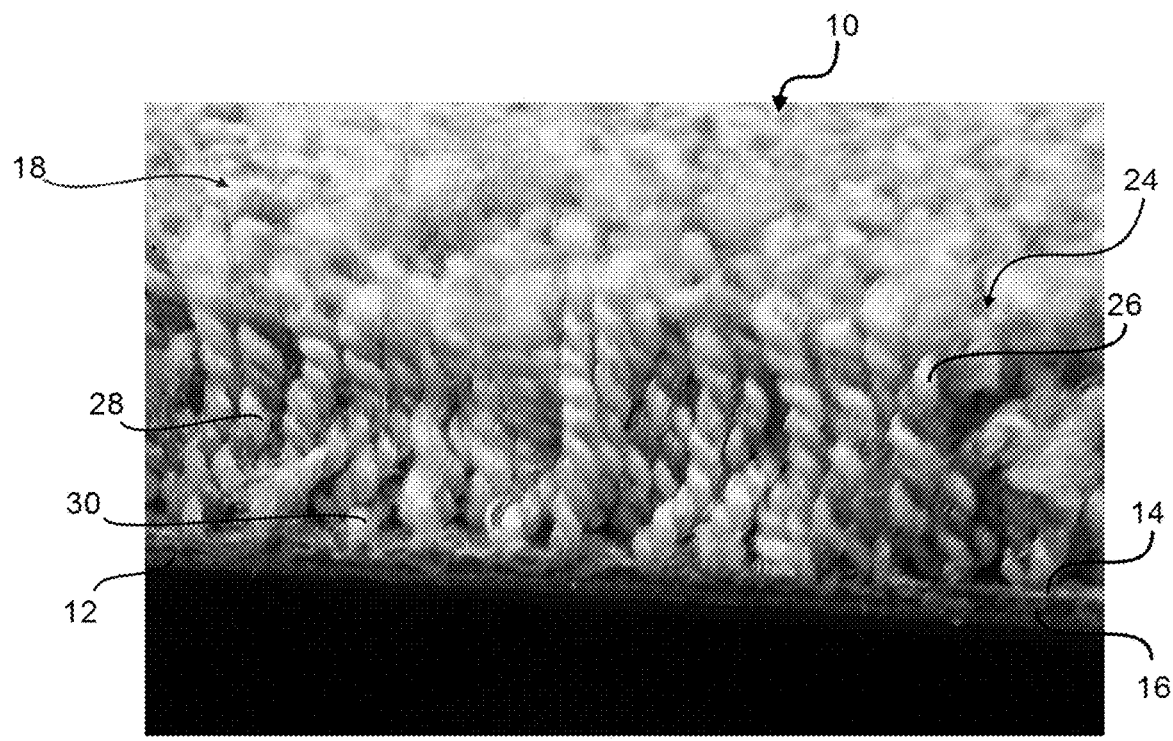
FIG. 2 displays an exemplary carpet product having entangled carpet fibers as described herein.
Figure 3:
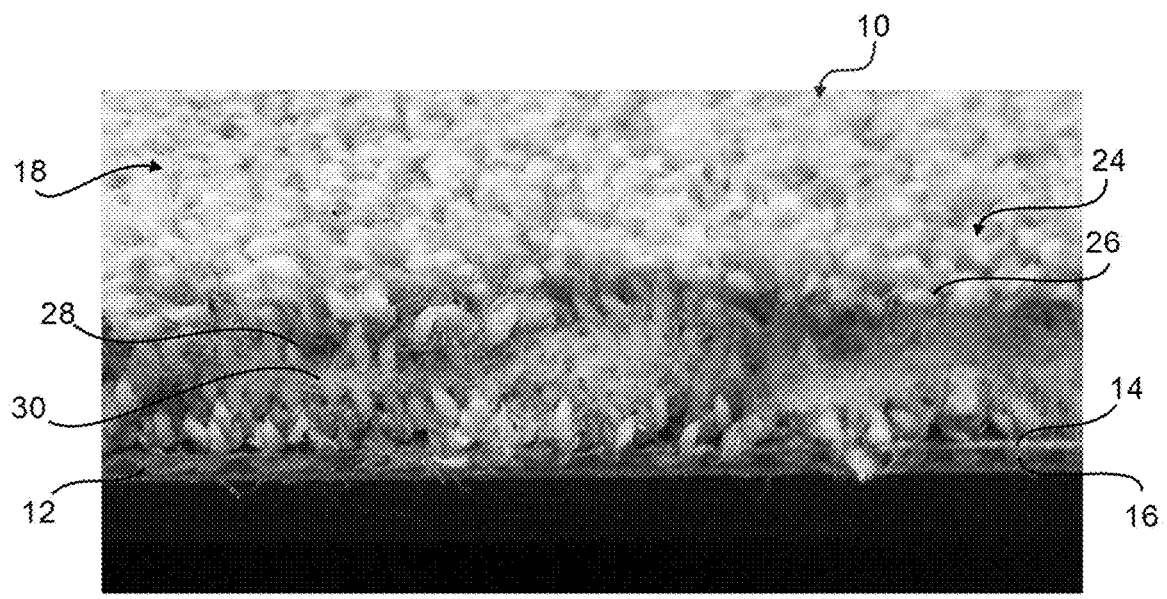
FIG. 3 displays an exemplary carpet product having entangled carpet fibers as described herein. As shown, the carpet product includes added fibers to promote entanglement among the carpet fibers.

In one aspect, as shown in FIGS. 2 and 3, the carpet product 10 can comprise a primary backing layer 12 having a top surface 14 and a plurality of edges 16. In another aspect and with reference to FIGS. 2, 3 and 5, the carpet product 10 can comprise a plurality of yarn tufts 18 tufted in and extending upwardly from the top surface 14 of the primary backing layer 12 to form a tufted carpet product 10. In this aspect, the tufted carpet product 10 can have an inner portion 22 and a peripheral portion 24 surrounding at least a portion of the inner portion and extending along at least one of the edges 16 of the primary backing layer 12. As used herein, the term "yarn tuft" refers to any yarn or fiber structure that extends upwardly from a primary backing layer. In exemplary aspects, a "yarn tuft" as disclosed herein can be formed by a conventional tufting process and can cooperate with other yarn tufts to define a face of a carpet product. Each yarn tuft can have any suitable tuft profile, including, for example and without limitation, cut yarn stitches or loop yarn stitches. It is contemplated that the tufted carpet products 10 disclosed herein can comprise yarn tufts having varying tuft profiles, including, for example, a combination of cut yarn stitches and loop yarn stitches. In exemplary aspects, the plurality of yarn tufts 18 can comprise a plurality of peripheral yarn tufts 26 positioned within the peripheral portion 24 of the tufted carpet product 10. In these aspects, the plurality of peripheral yarn tufts 26 can comprise a first plurality of peripheral yarn tufts 30 and a second plurality of peripheral yarn tufts 28. Optionally, the first plurality of peripheral yarn tufts 30 can be positioned proximate at least one edge of the carpet product 10. In further aspects, the first plurality of peripheral yarn tufts 30 can be anchored to the second plurality of peripheral yarn tufts 28.

Figure 8A:
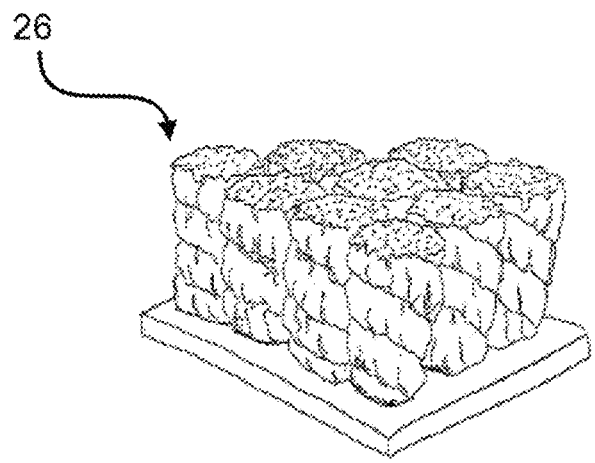
FIG. 8A is an isolated perspective view of a peripheral edge of a carpet product having a plurality of peripheral yarn tufts. As shown, each of the peripheral yarn tufts is tufted in and extends upwardly from the top surface of a primary backing layer of the tufted carpet product. As further described herein, the peripheral yarn tufts can include a first plurality of yarn tufts and a second plurality of yarn tufts.
Figure 8B:
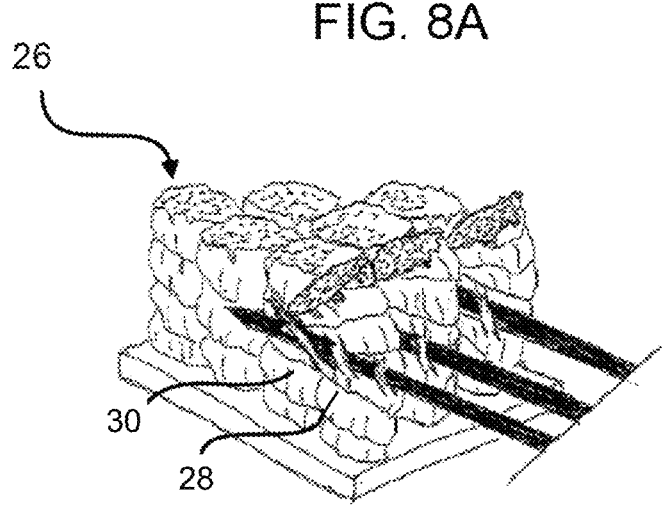
FIG. 8B is an isolated perspective view of the peripheral edge of the carpet product of FIG. 8A, showing the displacement of yarn from among the first plurality of yarn tufts to orient portions of the yarn substantially parallel or parallel to the primary backing layer and entangle the yarn with yarn tufts of the second plurality of yarn tufts.
Figure 8C:
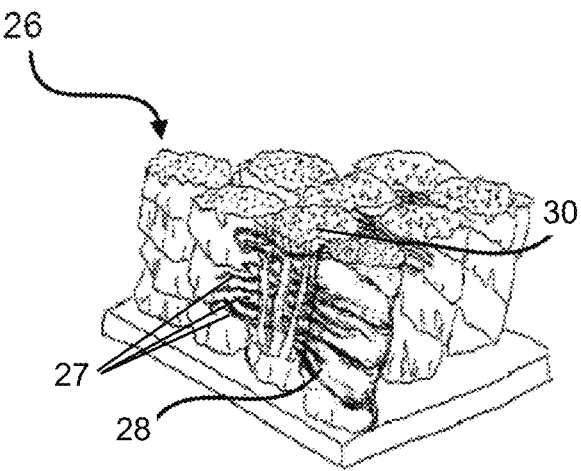
FIG. 8C depicts the carpet product of FIGS. 8A-8B following entanglement between the first plurality of yarn tufts and the second plurality of yarn tufts.

As further disclosed herein and shown in FIGS. 8A-8C, each anchored peripheral yarn tuft of the first plurality of peripheral yarn tufts 30 can be secured to other yarn tufts of the carpet product 10 to prevent or limit extension of portions of peripheral yarn tufts beyond an edge of the carpet product. It is contemplated that a peripheral yarn tuft of the first plurality of peripheral yarn tufts 30 can be entangled with and coupled to at least one yarn tuft of the second plurality of peripheral yarn tufts 28 to maintain the peripheral yarn tufts of the second plurality of peripheral yarn tufts 28 in a desired position. For example, entanglement between the first plurality of peripheral yarn tufts 30 and the second plurality of peripheral yarn tufts 28 can ensure that the second plurality of peripheral yarn tufts are maintained in a substantially vertical position relative to the primary backing layer 12. In these aspects, the entanglement of the first and second plurality of peripheral yarn tufts 30, 28 can ensure that no peripheral yarn tuft of the first plurality of peripheral yarn tufts extends radially beyond a reference plane 42 that is positioned at a selected angle 44 relative to a vertical plane 46 that is substantially perpendicular or perpendicular to the primary backing layer 12. In exemplary aspects, it is contemplated that the second plurality of peripheral yarn tufts 28 can be considered "substantially vertical" when the yarn tufts are: parallel or substantially parallel to the vertical plane 46 (i.e., perpendicular or substantially perpendicular to the primary backing layer 12) or at an angle of 60 degrees to 120 degrees with respect to the primary backing layer 12 or, optionally, at an angle of 75 degrees to 105 degrees with respect to the primary backing layer or, optionally, at an angle of about 90 degrees with respect to the primary backing layer. Optionally, upon entanglement between an anchored peripheral yarn tuft of the first plurality of peripheral yarn tufts 30 and another yarn tuft (optionally, another peripheral yarn tuft), the non-entangled fibers of the anchored peripheral yarn tuft 30 can be retained in a substantially vertical position. In this optional aspect, it is contemplated that the non-entangled fibers of the anchored yarn tufts of the first plurality of peripheral yarn tufts 30 can be considered "substantially vertical" when the non-entangled fibers of the yarn tufts are parallel or substantially parallel to the vertical plane 46 (i.e., perpendicular or substantially perpendicular to the primary backing layer 12) or at an angle of 50 degrees to 130 degrees with respect to the primary backing layer 12 or, optionally, at an angle of 75 degrees to 105 degrees with respect to the primary backing layer or, optionally, at an angle of about 90 degrees with respect to the primary backing layer.

Each yarn tuft of the plurality of peripheral yarn tufts 26 of the carpet product 10 can comprise a plurality of filaments 27 that are bunched together to produce the yarn tuft. In exemplary aspects, as shown in FIG. 8C, at least a portion (e.g., at least one filament 27) of each anchored peripheral yarn tuft of the first plurality of peripheral yarn tufts 30 can be displaced inwardly (away from an edge of the carpet product 10 to engage and become entangled with one or more peripheral yarn tufts of the second plurality of peripheral yarn tufts 28. Optionally, as shown in FIG. 8C, a plurality of filaments 27 of at least one anchored peripheral yarn tuft of the first plurality of peripheral yarn tufts 30 can engage and become entangled with one or more peripheral yarn tufts (optionally, one or more adjacent peripheral yarn tufts) of the second plurality of peripheral yarn tufts 28. Optionally, in some aspects, it is contemplated that entangled filaments of the anchored peripheral yarn tufts of the first plurality of peripheral yarn tufts 30 can be oriented substantially parallel or parallel to the primary backing layer 12; however, it is contemplated that any orientation of the entangled filaments can be employed, provided sufficient engagement between the anchored peripheral yarn tuft 30 and the peripheral yarn tuft of the second plurality of peripheral yarn tufts 28 is achieved. In these aspects, it is contemplated that the entangled filaments of an anchored peripheral yarn tuft of the first plurality of peripheral yarn tufts 30 can be considered "substantially parallel" to the primary backing layer 12 when they are parallel to the primary backing layer or are aligned with an axis that forms an acute angle less than 30 degrees (optionally, less than 15 degrees) with a plane 13 that coincides with, or is generally aligned with, the primary backing layer. As used herein, the term "entangle" or "entangled" refers to mechanical engagement between a displaced (e.g., anchored) yarn tuft 30 or filament 27 and another yarn tuft or filament that is sufficient to retain the anchored yarn tuft in a desired position (e.g., a substantially vertical position) relative to the primary backing layer 12. In exemplary aspects, at least one filament from an anchored yarn tuft of the first plurality of peripheral yarn tufts 30 is inwardly displaced until it contacts and becomes engaged and entangled with portions of another yarn tuft, such as within gaps between filaments 27 of the yarn tuft that serves as an anchor for the anchored yarn tuft. As further disclosed herein, it is contemplated that entanglement as described herein can prevent portions of the anchored yarn tufts from extending beyond an edge of the carpet product in an undesired manner.

In exemplary aspects, it is contemplated that at least one (optionally, each) anchored peripheral yarn tuft 30 can become entangled with a single, corresponding peripheral yarn tuft 28. In other exemplary aspects, it is contemplated that at least one (optionally, each) anchored peripheral yarn tuft 30 can become entangled with a plurality of peripheral yarn tufts 28. In still further exemplary aspects, it is contemplated that at least one (optionally, each) anchored peripheral yarn tuft 30 can become entangled with both a peripheral yarn tuft 28 and another anchored peripheral yarn tuft.

Although the entanglement between two adjacent yarn tufts is described herein as being applied to peripheral yarn tufts near an edge of a carpet product, it is contemplated that such entanglement can also be produced between adjacent yarn tufts within other portions (e.g., inner portions) of a carpet product to maintain a desired position (e.g., a desired vertical or substantially vertical position) of yarn tufts relative to the primary backing layer. It is further contemplated that the disclosed entanglement can be used to maintain yarn tufts in desired angled or non-vertical positions. Although generally described herein as producing entanglement between peripheral yarn tufts, it is contemplated that, in some exemplary aspects, the carpet products disclosed herein can include peripheral yarn tufts that are inwardly displaced from an edge of a carpet to become entangled with yarn tufts that are Optionally, in exemplary aspects, the pile height of the tufted yarn tufts 18 of the carpet product 10 can vary over the tufted carpet.

Optionally, in further exemplary aspects, the peripheral portion 24 of the tufted carpet product 10 can completely surround the inner portion 22 of the tufted carpet product. In these aspects, the peripheral portion 24 can extend inwardly from the edges 16 of the primary backing layer 12 and have a width that is less than about 30% of the operative width of the tufted carpet.

Figure 7A:
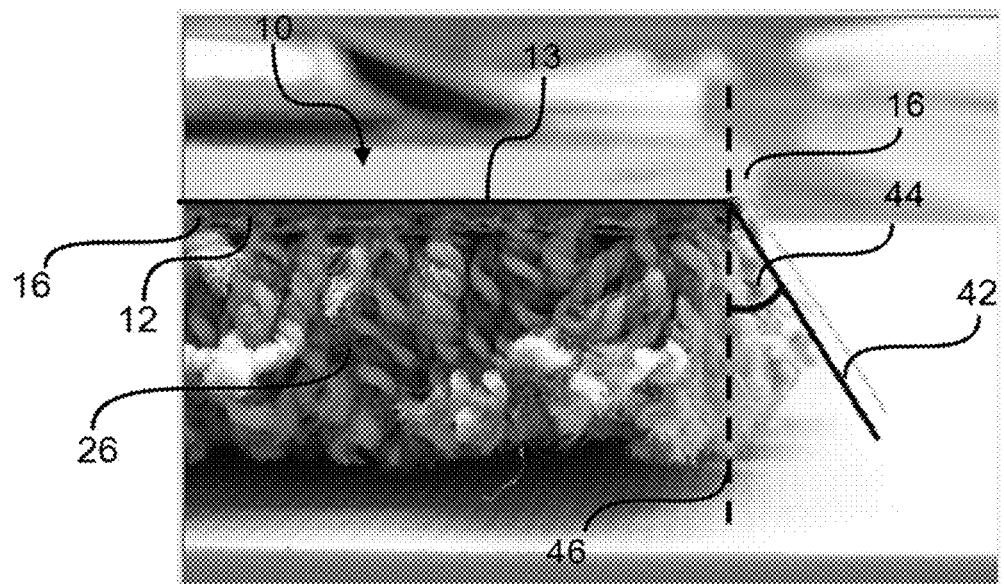
FIG. 7A is a side perspective view of an exemplary carpet product having entangled peripheral yarn tufts as described herein. As shown, in an ideal carpet product, the peripheral yarn tufts do not extend beyond a reference plane that is coincident with or positioned at an acute angle relative to a vertical plane.
Figure 7B:
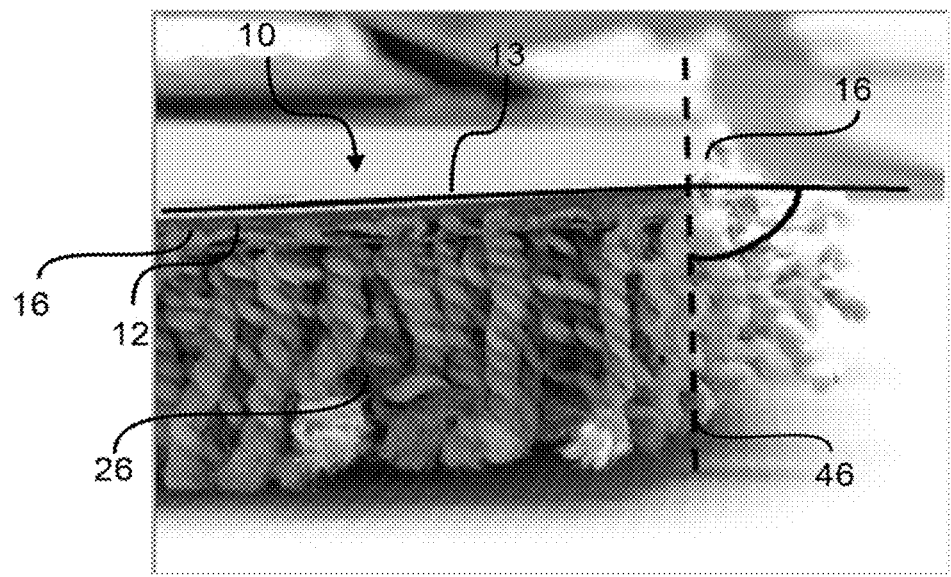
FIG. 7B is a perspective view of a conventional carpet product with unsecured edge fibers as described herein. As shown, the peripheral yarn tufts of the conventional carpet product extend well beyond the reference plane shown in FIG. 7A.

In exemplary aspects and with reference to FIGS. 7A and 7B, following entanglement with the second plurality of peripheral yarn tufts 28, the peripheral yarn tufts of the first plurality of peripheral yarn tufts 30 can have a mechanical stand fastness sufficient to prevent radial displacement of any peripheral yarn tuft of the first plurality of peripheral yarn tufts beyond a reference plane 42 that is positioned at a selected angle 44 relative a vertical plane 46 that is substantially perpendicular or perpendicular to a plane 13 coinciding with (i.e., containing) the primary backing layer 12. As shown in FIG. 7A, the vertical plane 46 can coincide with an edge of the carpet product 10. Optionally, in these aspects, the selected angle 44 can be less than about 40 degrees. In other aspects, the selected angle 44 can be less than about 30 degrees. In other aspects, the selected angle 44 can be less than about 20 degrees. In still other aspects, the selected angle 44 can be less than about 10 degrees. In still other aspects, the selected angle 44 can be less than about 5 degrees. In still other aspects, the selected angle 44 can be about 0 degrees such that the reference plane substantially corresponds to the vertical plane 46. In still other aspects, the selected angle 44 can be negative (e.g., −5 degrees or greater, −10 degrees or greater, −15 degrees or greater, −20 degrees or greater, and the like) such that at least a portion of the anchored peripheral yarn tuft of the first plurality of peripheral yarn tufts 30 is angled inwardly away from an edge of the carpet product.

In one exemplary aspect, at least a portion (e.g., at least one filament) of at least one anchored peripheral yarn tuft of the first plurality of peripheral yarn tufts 30 can be entangled with one or more yarn tufts within the inner portion 22 of the tufted carpet product 10. In another exemplary aspect, at least a portion (e.g., at least one filament) of at least one anchored peripheral yarn tuft 30 can be entangled with at least two other yarn tufts of the tufted carpet product 10.

In still another exemplary aspect, at least one filament of at least one anchored peripheral yarn tuft of the first plurality of peripheral yarn tufts 30 can have a tip 34 that is displaced inwardly by a selected distance when the anchored peripheral yarn tuft is entangled with other yarn tufts. In this aspect, it is contemplated that the selected distance can range from about 0.1 inch to about 1.0 inch.

Methods of Making Carpet Products

In one aspect, as shown in FIGS. 8A-8C, a carpet product 10 as disclosed herein can be produced by displacing a first plurality of peripheral yarn tufts 28 of a tufted carpet product 10 in an inward direction to entangle a second plurality of peripheral yarn tufts 30 of the tufted carpet product. In this aspect, each of the peripheral yarn tufts 28, 30 can be tufted in and extend upwardly (optionally, substantially perpendicularly or perpendicularly) from a top surface 14 of a primary backing layer 12 of the tufted carpet product 10. As further disclosed herein, at least a portion (e.g., at least one filament) of each yarn tuft of the first plurality of peripheral yarn tufts 28 can be oriented inwardly away from an edge of the carpet product 10 to engage and become entangled with at least one yarn tuft of the second plurality of peripheral yarn tufts 30. As further disclosed herein, the first plurality of yarn tufts 28 and the second plurality of yarn tufts 30 can be positioned within a peripheral portion 24 of the tufted carpet product 10, and the peripheral portion of the tufted carpet product can surround at least a portion of an inner portion 22 of the tufted carpet product. As further disclosed herein, in some aspects, at least a portion (i.e., at least one filament) of at least one yarn tuft of the first plurality of yarn tufts (i.e., an anchored peripheral yarn tuft 30) can be entangled with one or more yarn tufts within the inner portion 22 of the tufted carpet product 10. Optionally, in these aspects, at least one yarn tuft of the first plurality of yarn tufts (i.e., an anchored peripheral yarn tuft 30) can be entangled with at least two other yarn tufts of the tufted carpet product 10.

Figure 4A:
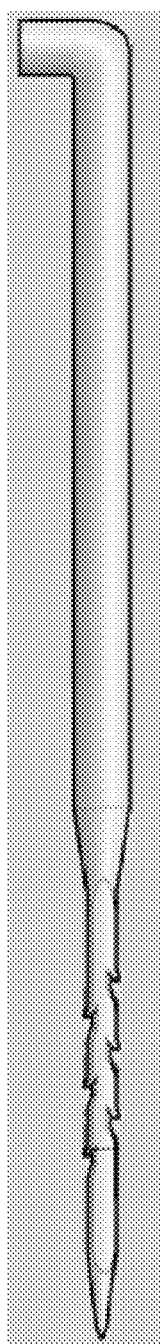
FIGS. 4A and 4B depict plan views of exemplary needles as described herein, namely, a single reduction needle (FIG. 4A) and a double reduction needle (FIG. 4B).
Figure 4B:
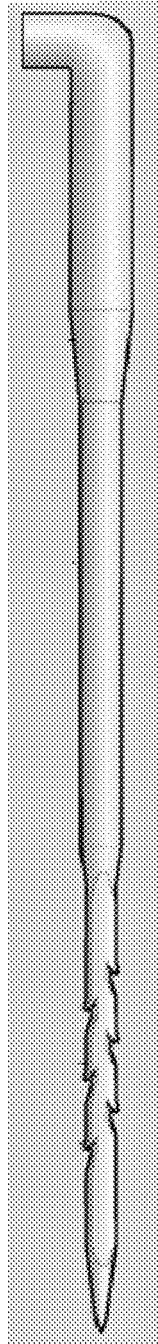
Figure 5:
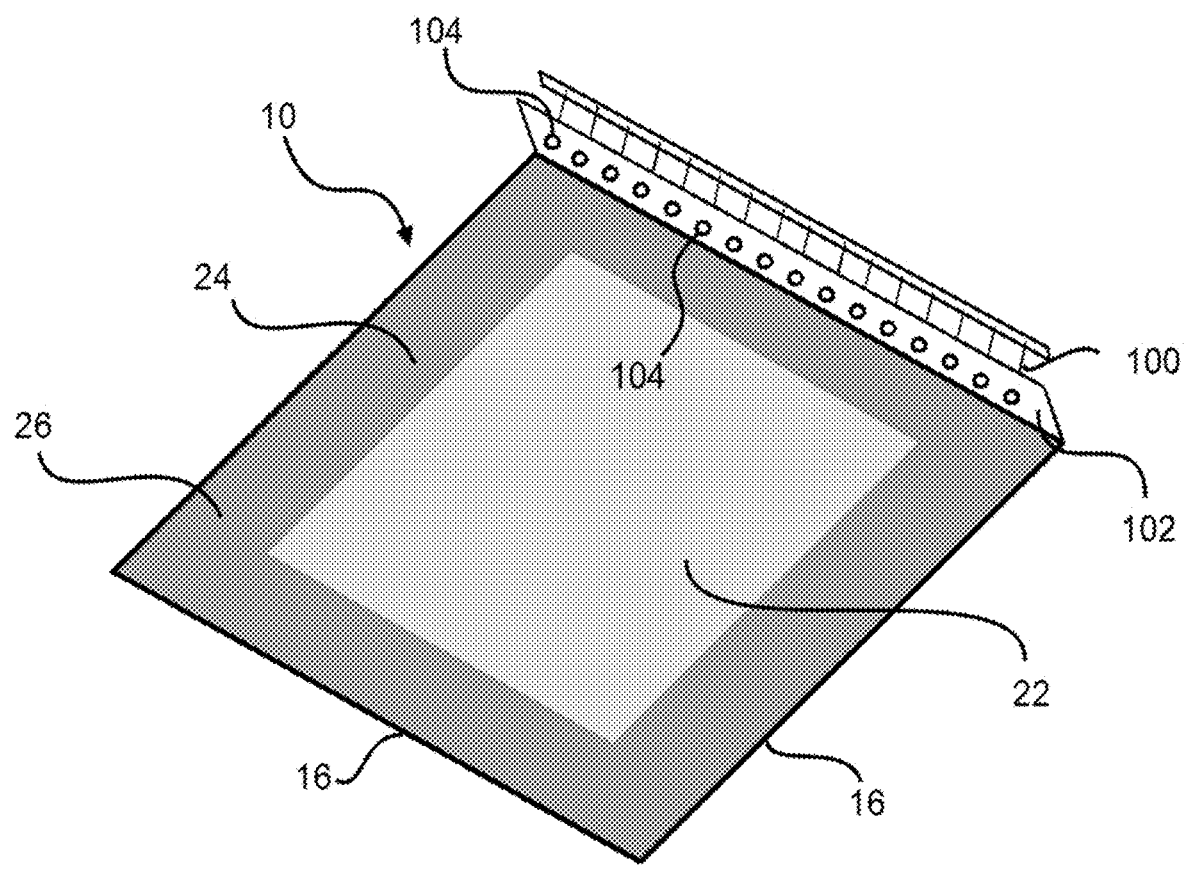
FIG. 5 is an isometric view of an exemplary carpet product and an exemplary assembly for creating entanglement between carpet fibers as described herein. As shown, the assembly can include a plate and needles that are received within openings of the plate.

In exemplary aspects and as shown in FIGS. 4A-5, the first plurality of peripheral yarn tufts 28 can be displaced using at least one needle 100 that is inserted into the peripheral yarn tufts in the inward direction. In further aspects, the at least one needle 100 can be inserted into the peripheral yarn tufts 26 at a desired time and speed. For example, in these aspects, each needle 100 can reciprocate at a rate ranging from 100 strokes per minute to about 2,000 strokes per minute. More particularly, in some aspects, each needle 100 can reciprocate at a rate ranging from 200 strokes per minute to about 1,000 strokes per minute.

In still further aspects, the at least one needle 100 can be inserted through at least one opening 104 in a plate 102. In these aspects, the plate 102 can be oriented substantially perpendicular or perpendicular to the primary backing layer 12, and the inward direction can be substantially parallel or parallel to the primary backing layer. Optionally, it is contemplated that the plate 102 can be substantially flush and/or aligned with an edge of the carpet product. In exemplary aspects, each needle 100 can be inserted within the peripheral yarn tufts 26 to a location that is a selected distance (in an inward direction) from an edge of the primary backing layer 12 of the tufted carpet product 10. Optionally, in these aspects, the selected distance can range from about 0.1 inch to about 1 inch.

In one exemplary aspect, as further disclosed herein, the at least one needle 100 can comprise at least one barbed needle that mechanically secures the face filaments to one another on the edge(s) of the carpet product in a direction that is substantially perpendicular (optionally, perpendicular) to the tufted direction of the face filaments. In this aspect, as the needle penetrates the peripheral yarn tufts, some filaments can become lodged in the barbed section of the needle and can then be pushed and pulled in the direction of the needle travel until the displaced filaments engage filaments of adjacent fiber bundles (yarn tufts). The use of needles in this manner can create filament anchors in the yarn tuft filament bundles of adjacent filament bundles and can physically connect the filaments as they are sewn into other filament bundles. In exemplary aspects, as the distal end of each needle is advanced from the periphery of the carpet product in an inward direction, it is contemplated that the needle can create gaps within inner yarn tufts that are capable of receiving filaments or groups of filaments that have been displaced from an anchored yarn tuft to increase or promote entanglement as further disclosed herein.

It is contemplated that various sizes and constructions of needles can be used as disclosed herein. Preferably, in one aspect, the needles can be barbed in the direction of insertion into the edge of the tile. In this aspect, the tile can be held in place substantially parallel or parallel to the needling apparatus. The depth and stroke speed can be determined by the carpet fiber type and the density of the carpet face fiber. The carpet product can be needled along an edge of the carpet product as it passes the reciprocating needle bar. The number of needles and the count of stokes can be determined by the construction of the carpet face filaments and the need for the security of the filaments to interlock.

Optionally, in some aspects, the at least one opening 104 of the plate 102 can comprise a plurality of openings 104. In these aspects, the plurality of openings 104 can optionally be staggered relative to at least one axis. In other aspects, the plurality of openings 104 can optionally be linear. In exemplary aspects, each opening 104 of the plurality of openings 104 can be spaced from adjacent openings by a predetermined distance ranging from about 1 mm to about 3 cm.

Thus, in exemplary aspects, the carpet products disclosed herein can have secured edge carpet yarn tufts of a cut pile face on the perimeter of the carpet product. As disclosed herein, in exemplary aspects, the edge carpet yarn tufts can be secured in such a manner by inwardly displacing filaments of the edge yarn tufts to create entanglement with filaments of substantially vertical yarn tufts; however, it is contemplated that any mechanical or chemical means for bonding or securing the edge yarn tufts in a substantially upright orientation can be employed to reduce the possibility of the edge yarn tufts being trapped between adjacent carpet products when installed. Optionally, in exemplary aspects, the mechanical means can be used to push filaments located on the perimeter of a carpet product into adjacent tufts of the same carpet product to create a physical connection of the filaments. In even further aspects, the mechanical means can comprise a source of high-pressure air and/or water. In these aspects, the source of high-pressure air and/or water can provide jets of air and/or water having sufficient energy to move filaments from the tufted bundle so as to have stray filaments pushed into adjacent filaments to make fibrous mechanical connections. In other aspects, the mechanical means can comprise a heated rod and/or a heated shoe. In these aspects, the heated rod and/or heated shoe can be used to heat fuse the edge yarn tufts/filaments. In further aspects, the mechanical means can comprise threads that can be sewn into the edges to secure the yarn tufts/filaments. In even further aspects, the mechanical means can comprise ultrasonic pins to secure the edge yarn tufts/filaments. In other aspects, the mechanical means can comprise mechanical combing of the edge yarn tufts/filaments. In other aspects, the mechanical means can comprise vacuum combing behind the edge yarn tufts/filaments. In further aspects, the mechanical means can comprise hot air jets. In these aspects, the hot air jets can be used to move and fuse the edge yarn tufts/filaments. In even further aspects, the mechanical means can comprise at least one brush or pin, which can be either metallic or non-metallic. In these aspects, the brush or pin can be used to push the edge filaments into adjacent yarn tufts/filaments. In other aspects, the mechanical means can comprise affixed paper tabs. In these aspects, the affixed paper tabs can be removed once the carpet product (e.g., tile) is installed to provide a physical barrier and keep the filaments affixed.

Alternatively, in other exemplary aspects, a chemical means, such as a water borne chemical capable of adhering the edge yarn tufts/filaments together, can be applied to improve the vertical nature of the yarn tufts/filaments in the same manner as described herein by chemically adhering the yarn tufts/filaments on the perimeter. In one aspect, it is contemplated that the chemical means can comprise starches or other similar non-permanent adhesives, such as waxes, that chemically "glue" the edge yarn tufts/filaments of the carpet product together. In this aspect, it is contemplated that the chemicals can be spray applied or brush applied to the edge yarn tufts/filaments of the carpet product. It is further contemplated that the chemicals can be applied via a lick roller. In another aspect, the chemical means can comprise a bead of hot melt or other similar polymers that can be extruded to form a retaining ring around the carpet product. In this aspect, the polymer can be left in place after installation or removed once the carpet product is installed.

In exemplary aspects, the perimeter yarn tufts of the carpet product can be physically and mechanically connected to inland adjacent yarn tufts to retain the non-entangled filaments of the perimeter yarn tufts in a substantially perpendicular (i.e., substantially vertical) orientation relative to the backing material and a substantially parallel or parallel orientation relative to adjacent fiber bundles (yarn tufts). In these aspects, the disclosed methods can reduce the likelihood that yarn tufts/fibers will become entrapped in the installation process, thereby improving the quality and process of installation. In exemplary aspects, the disclosed methods can provide security of the edge yarn tufts/filaments for the period of shipment and placement on the floor during installation.

Although described herein with reference to yarn tufts, it is contemplated that the disclosed methods for inwardly displacing yarn or filaments to create entanglement can also be applied to woven flooring products.

Optionally, in exemplary aspects, the apparatus for needling (including the plate) can be designed and made with reciprocating action of the needles and to handle carpet products (e.g., carpet tiles) of a fixed size and thickness. Optionally, all four sides of the carpet product can be needled simultaneously. Alternatively, the edges of the carpet product can be needled at different times (optionally, sequentially as part of a production line). In exemplary aspects, the plate can be a stripper plate, such as an integrated and removable lamella plate which can function as a bed plate. In other exemplary aspects, the needles can have a shank, barbs and/or a blade as are known in the art. In these exemplary aspects, the barbs can point in the direction of the tip and be configured to pull filaments on the inward plunge stroke and entangle the filaments to provide mechanical fastening. On the extraction of the needle, it is contemplated that the barbs will have no effect on the yarn tufts/filaments and leave the yarn tufts/filaments in the entangled configuration. Optionally, such needles can be purchased from Foster Needle (for example, FNC5240506), Groz-Bechert, or Novo. In other exemplary aspects, cut yarn tufts/filaments can be added to the edges of the tile to create physical connections with adjacent yarn tufts/filaments. Optionally, in these aspects, the added yarn tufts/filaments can be a low denier short fiber or a low melt fiber web, which can be applied to the edges via a small carded web material or other means known in the art. In one exemplary aspect, the added yarn tufts/filaments can be needled into the edges to provide a mechanical bond as with no added yarn tufts/filaments. Alternatively, heat can be used to activate the low melt material of the adjacent edge yarn tufts/filaments and bond the edges together with a chemical/mechanical bond of the low melt fibers. Optionally, in these exemplary aspects, the web can be applied from a dedicated card or by application of a thin web or by scattering of fibers.

In still further aspects, disclosed are packaging containers for shipment and storage of the completed carpet products (e.g., tiles). In these aspects, the packing containers can have sizes that are complementary to the size of the cut carpet product (e.g., have inner dimensions that are precisely the same size as the outer dimensions of the carpet product). In these aspects, as the tile is pressed in the shipping and storage box, the face fiber tufts on the edges tufts can be held upright and retained in the upright position, and this position can be maintained during the shipment process. At the time of installation, the tiles can be removed from the end of the container that is opposite to the end by which the carpet product was inserted into the container, thereby ensuring that the carpet product is provided with the upright tuft position. Optionally, the packaging container can contain a slip resistant band at the top of the container to "comb" the yarn tufts/filaments in the proper upright orientation when being pushed into the box.

EXPERIMENTAL EXAMPLES

The presently described technology and its advantages will be better understood by reference to the following examples. These examples are provided to describe non-exhaustive embodiments of the present technology. By providing these examples, the scope of the presently described and claimed technology is not limited in spirit or scope. It will be understood by those skilled in the art that the full scope of the presently described technology encompasses at least the subject matter defined by the claims appending this specification, and any alterations, modifications, derivatives, combinations, or equivalents of those claims. Further, the citations provided herein are hereby incorporated by reference for the cited subject matter.

Example 1: Amount of Fiber Edge Failure

Figure 6A:
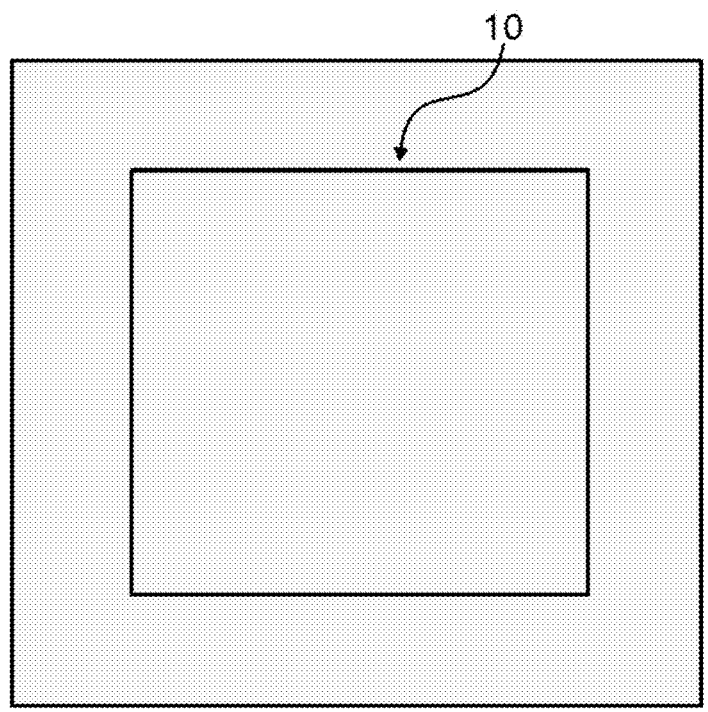
FIG. 6A is a plan view of an exemplary carpet product that is needle-punched on all four sides as described herein and situated within a frame having a known area, referred to herein as $A_{frame1}$. The carpet product of FIG. 6A has a backing with a known area, referred to herein as $A_{tile}$.
Figure 6B:
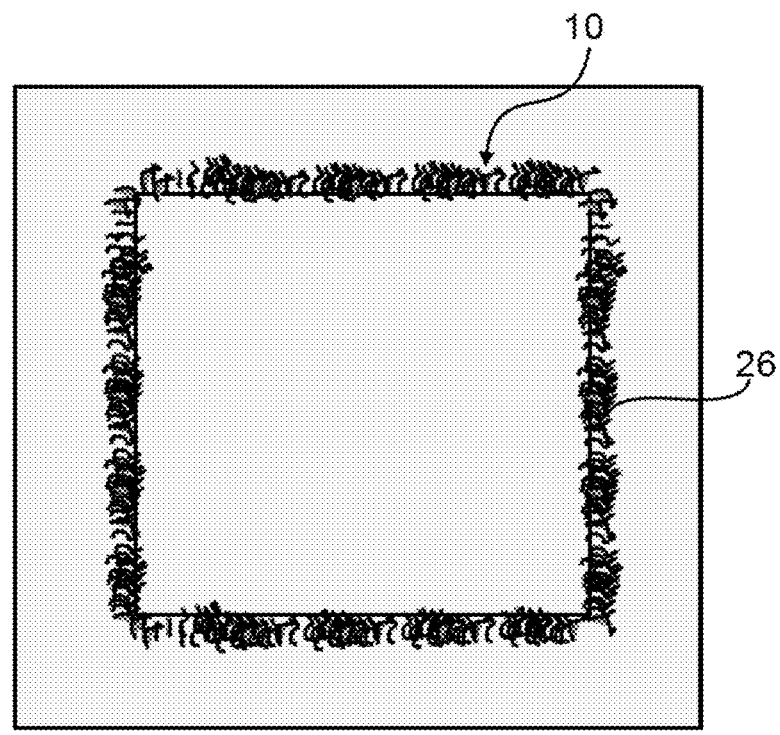
FIG. 6B is a plan view of a conventional carpet product positioned within the frame. As shown, the conventional carpet product has unsecured edges that extend outwardly from the carpet product (and outside of $A_{tile}$). As further described herein, imaging systems can be used to calculate the total area of the fibers of carpet products (e.g., needle-punched and conventional carpet products) that extend outside of known $A_{tile}$. These imaging systems can also be used to compare the area of the fibers of the conventional carpet product that extend outside $A_{tile}$ to the area of the fibers of the needle-punched carpet product that extend outside $A_{tile}$. This comparison can provide an indication of the ability of the methods disclosed herein to secure peripheral carpet fibers in a desired orientation relative to the edge of the carpet product.

In one experimental example, the amount of fiber edge failure of a conventional carpet product having unsecured edge fibers was determined. To determine the amount of fiber edge failure of the conventional carpet product, a baseline number, referred to as $A_{frame1}$ (FIG. 6A) was obtained by using SIGMASCAN software (Systat Software Inc.) to determine the percent cover of the exposed area known as $A_{frame1}$ when overlaid with $A_{tile}$, representing the area of the carpet tile backing. SIGMASCAN used a selective pixel count, on a preset color basis, to determine the relative percent area, compared to the total pixels in the image. A carpet tile sample ($Sample_{unsecured}$) with unsecured edge fibers and the same backing dimensions as $A_{tile}$, was then pictured similarly to the baseline measurement, with additional fiber encroachment onto $A_{frame2}$ (FIG. 6B). This encroachment, described herein as percent edge failure, was measured as the ratio between $A_{frame2}$ and $A_{frame1}$, relative to the originally exposed $A_{frame1}$, as shown below:

$$\% \text{ Edge failure} = \left[1 - \left(\frac{A_{frame2}}{A_{frame1}}\right)\right] \times 100$$

In exemplary aspects, it is contemplated that the Percent Edge Failure of the carpet products disclosed herein can range from about 0 to about 25 percent and, more preferably, range from about 0 to about 5 percent.

Example 2: Degree of Fiber Edge Failure

In another experimental example, the degree of fiber edge failure of a carpet product 10, as described herein, was compared to the degree of fiber edge failure of a conventional carpet product having unsecured edges. FIG. 7A shows a carpet product 10 having a vertical plane 46 that extends substantially perpendicularly or perpendicularly to a plane 13 of the primary backing layer 12 and coincides with (i.e., is aligned with) an edge of the primary backing layer 12. A measured angle by SIGMASCAN software was used to determine the total angle between the primary backing layer 12 and the reference plane 42, which is tangent to the most outer tuft. The edge failure angle was equal to the difference between the measured total angle between the primary backing layer 12 and the reference plane 42 ($Angle_{Sigmascan}$) and the 90 degree angle formed between the primary backing layer 12 and the vertical plane 46, as shown below:

° Edge failure=$Angle_{Sigmascan}$−90°

In this example, as shown in FIG. 7A, the degree of Edge Failure (corresponding to selected angle 44) for the carpet product having entangled edge fibers as disclosed herein was 31.2°. In contrast, as shown in FIG. 7B, the degree of Edge Failure for the carpet product having unsecured edges was 80°.

Exemplary Aspects

In view of the described devices, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A carpet product comprising: a primary backing layer having a top surface and a plurality of edges; and a plurality of yarn tufts tufted in and extending upwardly from the top surface of the primary backing layer to form a tufted carpet product, the tufted carpet product having an inner portion and a peripheral portion surrounding at least a portion of the inner portion and extending along at least one of the edges of the primary backing layer, wherein the plurality of yarn tufts comprises a plurality of peripheral yarn tufts positioned within the peripheral portion of the tufted carpet product, wherein the plurality of peripheral yarn tufts comprises a first plurality of peripheral yarn tufts and a second plurality of peripheral yarn tufts, wherein at least a portion of each peripheral yarn tuft of the first plurality of peripheral yarn tufts is entangled with one or more of the peripheral yarn tufts of the second plurality of peripheral yarn tufts.

Aspect 2: The carpet product of aspect 1, wherein the carpet product is a broadloom carpet.

Aspect 3: The carpet product of aspect 1, wherein the carpet product is a carpet tile.

Aspect 4: The carpet product of any one of the preceding aspects, wherein the pile height of the tufted yarn tufts varies over the tufted carpet.

Aspect 5: The carpet product of any one of the preceding aspects, wherein the peripheral portion of the tufted carpet product completely surrounds the inner portion of the tufted carpet product.

Aspect 6: The carpet product of aspect 5, wherein the peripheral portion extends inwardly from the edges of the primary backing layer and has a width that is less than about 30% of the operative width of the tufted carpet.

Aspect 7: The carpet product of any one of the preceding aspects, wherein, following entanglement with the second plurality of peripheral yarn tufts, the peripheral yarn tufts of the first plurality of peripheral yarn tufts have a mechanical stand fastness sufficient to prevent radial displacement of any peripheral yarn of the first plurality of peripheral yarn tufts beyond a reference plane that is positioned at a selected angle relative to a vertical plane that is substantially perpendicular or perpendicular to the primary backing layer, wherein the selected angle is less than about 40 degrees.

Aspect 8: The carpet product of aspect 7, wherein the selected angle is less than about 30 degrees.

Aspect 9: The carpet product of aspect 7, wherein the selected angle is less than about 20 degrees.

Aspect 10: The carpet product of aspect 7, wherein the selected angle is less than about 10 degrees.

Aspect 11: The carpet product of aspect 7, wherein the selected angle is less than about 5 degrees.

Aspect 12: The carpet product of aspect 7, wherein the selected angle is about 0 degrees.

Aspect 13: The carpet product of aspect 7, wherein the selected angle is negative such that at least a portion of the peripheral yarn tuft of the first plurality of peripheral yarn tufts is angled inwardly away from an edge of the carpet product.

Aspect 14: The carpet product of any one of the preceding aspects, wherein at least a portion of at least one peripheral yarn tuft of the first plurality of peripheral yarn tufts is entangled with one or more yarn tufts within the inner portion of the tufted carpet product.

Aspect 15: The carpet product of any one of the preceding aspects, wherein each peripheral yarn tuft of the first plurality of peripheral yarn tufts is entangled with at least two other yarn tufts of the tufted carpet product.

Aspect 16: The carpet product of any one of the preceding aspects, wherein each peripheral yarn tuft of the first plurality of peripheral yarn tufts comprises at least one filament that has a tip that is displaced inwardly by a selected distance when the peripheral yarn tuft of the first plurality of peripheral yarn tufts is entangled with other yarn tufts, and wherein the selected distance ranges from about 0.1 inch to about 1.0 inch.

Aspect 17: The carpet product of any one of the preceding aspects, wherein the entanglement of peripheral yarn tufts ensures that no peripheral yarn tuft of the first plurality of peripheral yarn tufts extends radially beyond a reference plane that is positioned at a selected angle relative a vertical plane that is substantially perpendicular or perpendicular to the primary backing layer, wherein the selected angle is less than about 40 degrees.

Aspect 18: A carpet product comprising: a primary backing layer having a top surface and a plurality of edges; and a plurality of yarn tufts tufted in and extending upwardly from the top surface of the primary backing layer to form a tufted carpet product, the tufted carpet product having an inner portion and a peripheral portion surrounding at least a portion of the inner portion and extending along at least one of the edges of the primary backing layer, wherein the plurality of yarn tufts comprises a plurality of peripheral yarn tufts positioned within the peripheral portion of the tufted carpet product, wherein the plurality of peripheral yarn tufts comprises a plurality of vertical peripheral yarn tufts that are oriented substantially perpendicularly or perpendicularly to the primary backing layer and a plurality of anchored peripheral yarn tufts, wherein at least a portion of each anchored peripheral yarn tuft is entangled with one or more of the vertical peripheral yarn tufts, and wherein the entanglement of peripheral yarn tufts ensures that no anchored peripheral yarn tuft extends radially beyond a reference plane that is positioned at a selected angle relative a vertical plane that is substantially perpendicular or perpendicular to the primary backing layer, wherein the selected angle is less than about 40 degrees.

Aspect 19: The carpet product of aspect 18, wherein the carpet product is a broadloom carpet.

Aspect 20: The carpet product of aspect 18, wherein the carpet product is a carpet tile.

Aspect 21: The carpet product of any one of aspects 18-20, wherein the peripheral portion of the tufted carpet product completely surrounds the inner portion of the tufted carpet product.

Aspect 22: The carpet product of any one of aspects 18-21, wherein the anchored peripheral yarn tufts have a mechanical stand fastness sufficient to prevent radial displacement of any anchored peripheral yarn tuft beyond the reference plane.

Aspect 23: The carpet product of any one of aspects 18-22, wherein the selected angle is less than about 30 degrees.

Aspect 24: The carpet product of any one of aspects 18-22, wherein the selected angle is less than about 20 degrees.

Aspect 25: The carpet product of any one of aspects 18-22, wherein the selected angle is less than about 10 degrees.

Aspect 26: The carpet product of any one of aspects 18-22, wherein the selected angle is less than about 5 degrees.

Aspect 27: The carpet product of any one of aspects 18-22, wherein the selected angle is about 0 degrees.

Aspect 28: The carpet of product of any one of aspects 18-22, wherein the selected angle is negative such that at least a portion of the anchored peripheral yarn tuft is angled inwardly away from an edge of the carpet product.

Aspect 29: The carpet product of any one of aspects 18-28, wherein at least a portion of at least one anchored peripheral yarn tuft is entangled with one or more yarn tufts within the inner portion of the tufted carpet product.

Aspect 30: The carpet product of any one of aspects 18-29, wherein each anchored peripheral yarn tuft is entangled with at least two other yarn tufts of the tufted carpet product.

Aspect 31: The carpet product of aspects 18-30, wherein at least one filament of each anchored peripheral yarn tuft has a tip that is displaced inwardly by a selected distance when the anchored peripheral yarn tuft is entangled with other yarn tufts, and wherein the selected distance ranges from about 0.1 inch to about 1.0 inch.

Aspect 32: A method comprising: displacing a first plurality of peripheral yarn tufts of a tufted carpet product in an inward direction to entangle a second plurality of peripheral yarn tufts of the tufted carpet product, each of the peripheral yarn tufts being tufted in and extending upwardly from a top surface of a primary backing layer of the tufted carpet product, wherein the entanglement of the yarn tufts of the first plurality of peripheral yarn tufts with the yarn tufts of the second plurality of peripheral yarn tufts anchors the first plurality of peripheral yarn tufts in a desired orientation relative to the primary backing layer.

Aspect 33: The method of aspect 32, wherein the first plurality of yarn tufts and the second plurality of yarn tufts are positioned within a peripheral portion of the tufted carpet product, and wherein the peripheral portion of the tufted carpet product surrounds at least a portion of an inner portion of the tufted carpet product.

Aspect 34: The method of aspect 33, wherein the first plurality of peripheral yarn tufts are displaced using at least one needle that is inserted into the peripheral yarn tufts in the inward direction.

Aspect 35: The method of aspect 34, wherein the at least one needle is inserted into the peripheral yarn tufts at a desired time and speed.

Aspect 36: The method of aspect 34, wherein the at least one needle is inserted through at least one opening in a plate, wherein the plate is oriented substantially perpendicular or perpendicular to the primary backing layer, and wherein the inward direction is substantially parallel or parallel to the primary backing layer.

Aspect 37: The method of aspect 36, wherein the at least one opening of the plate comprises a plurality of openings.

Aspect 38: The method of aspect 37, wherein the plurality of openings are staggered.

Aspect 39: The method of aspect 37, wherein the plurality of openings are linear.

Aspect 40: The method of aspect 37, wherein each opening of the plurality of openings is spaced from adjacent openings by a predetermined distance ranging from about 1 mm to about 3 cm.

Aspect 41: The method of aspect 35, wherein each needle reciprocates at a rate ranging from 100 strokes per minute to about 2,000 strokes per minute.

Aspect 42: The method of aspect 35, wherein each needle is inserted within the peripheral yarn tufts to a location that is a selected distance from an edge of the primary backing layer of the tufted carpet product, and wherein the selected distance ranges from about 0.1 inch to about 1 inch.

Aspect 43: The method of any one of aspects 32-42, wherein the carpet product is a broadloom carpet.

Aspect 44: The method of any one of aspects 32-42, wherein the carpet product is a carpet tile.

Aspect 45: The method of aspect 33, wherein the peripheral portion of the tufted carpet product completely surrounds the inner portion of the tufted carpet product.

Aspect 46: The method of aspect 33, wherein the yarn tufts of the first plurality of peripheral yarn tufts have a mechanical stand fastness sufficient to prevent radial displacement of any peripheral yarn tufts of the first plurality of peripheral yarn tufts beyond a reference plane that is positioned at a selected angle relative a vertical plane coinciding with an edge of the primary backing layer, wherein the selected angle is less than about 40 degrees.

Aspect 47: The method of aspect 46, wherein the selected angle is less than about 30 degrees.

Aspect 48: The method of aspect 46, wherein the selected angle is less than about 20 degrees.

Aspect 49: The method of aspect 46, wherein the selected angle is less than about 10 degrees.

Aspect 50: The method of aspect 46, wherein the selected angle is less than about 5 degrees.

Aspect 51: The method of aspect 46, wherein the selected angle is about 0 degrees.

Aspect 52: The method of aspect 46, wherein the selected angle is negative such that at least a portion of the peripheral yarn tuft of the first plurality of peripheral yarn tufts is angled inwardly away from an edge of the carpet product.

Aspect 53: The method of aspect 33, wherein at least a portion of at least one peripheral yarn tuft of the first plurality of peripheral yarn tufts is entangled with one or more yarn tufts within the inner portion of the tufted carpet product.

Aspect 54: The method of aspect 33, wherein each peripheral yarn tuft of the first plurality of peripheral yarn tufts is entangled with at least two other yarn tufts of the tufted carpet product.

Aspect 55: A carpet product comprising: a primary backing layer having a top surface; and a plurality of yarn tufts tufted in and extending upwardly from the top surface of the primary backing layer to form a tufted carpet product, wherein the plurality of yarn tufts comprises a plurality of substantially vertical yarn tufts that are oriented perpendicularly or substantially perpendicularly to the primary backing layer and a plurality of anchored yarn tufts, wherein at least a portion of each anchored yarn tuft is entangled with one or more of the substantially vertical yarn tufts.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, certain changes and modifications may be practiced within the scope of the appended claims.

What is claimed is:

1. A method comprising:
displacing a first plurality of peripheral yarn tufts of a tufted carpet product in an inward direction away from a periphery of the tufted carpet product to entangle, without heat fusion, a second plurality of peripheral yarn tufts of the tufted carpet product that are positioned inwardly of the first plurality of peripheral yarn tufts, each of the first and second plurality of peripheral yarn tufts being tufted in and extending upwardly from a top surface of a primary backing layer of the tufted carpet product,
wherein entanglement of the yarn tufts of the first plurality of peripheral yarn tufts with the second plurality of peripheral yarn tufts anchors the first plurality of peripheral yarn tufts to the second plurality of peripheral yarn tufts,
wherein the yarn tufts of the first plurality of peripheral yarn tufts and the second plurality of peripheral yarn tufts are mechanically secured to one another without being chemically adhered to one another, and wherein displacing the first plurality of peripheral yarn tufts of the tufted carpet product in the inward direction to entangle the second plurality of peripheral yarn tufts of the tufted carpet product comprises reciprocally moving a needle into the first plurality of peripheral yarn tufts in the inward direction and outwardly from the first plurality of peripheral yarn tufts in an opposed outward direction.

2. The method of claim 1, wherein the first plurality of peripheral yarn tufts and the second plurality of peripheral yarn tufts are positioned within a peripheral portion of the tufted carpet product, and wherein the peripheral portion of the tufted carpet product surrounds at least a portion of an inner portion of the tufted carpet product.

3. The method of claim 2, wherein the peripheral portion of the tufted carpet product surrounds an entirety of the inner portion of the tufted carpet product.

4. The method of claim 1, wherein the tufted carpet product has an operative width between a first edge and a second edge, wherein the entanglement of the yarn tufts of the first plurality of peripheral yarn tufts with the yarn tufts of the second plurality of peripheral yarn tufts extends inwardly from each of the first edge and the second edge by less than 30% of the operative width.

5. The method of claim 1, wherein the tufted carpet product is a broadloom carpet.

6. The method of claim 1, wherein the tufted carpet product is a carpet tile.

7. The method of claim 2, wherein the entanglement of the yarn tufts of the first plurality of peripheral yarn tufts with the yarn tufts of the second plurality of peripheral yarn tufts causes the peripheral yarn tufts of the first plurality of peripheral yarn tufts to have a mechanical stand fastness sufficient to prevent radial displacement of any peripheral yarn tuft of the first plurality of peripheral yarn tufts beyond a reference plane that is positioned at a selected angle relative a vertical plane that is perpendicular to the primary backing layer, wherein the selected angle is less than 40 degrees.

8. The method of claim 7, wherein the selected angle is less than 30 degrees.

9. The method of claim 7, wherein the selected angle is less than 20 degrees.

10. The method of claim 7, wherein the selected angle is less than 10 degrees.

11. The method of claim 7, wherein the selected angle is negative such that at least a portion of the peripheral yarn tuft of the first plurality of peripheral yarn tufts is angled inwardly away from an edge of the carpet product.

12. The method of claim 2, wherein displacing the first plurality of peripheral yarn tufts of the tufted carpet product in the inward direction to entangle the second plurality of peripheral yarn tufts of the tufted carpet product comprises entangling at least a portion of at least one peripheral yarn tuft of the first plurality of peripheral yarn tufts with one or more yarn tufts within the inner portion of the tufted carpet product.

13. The method of claim 1, wherein displacing the first plurality of peripheral yarn tufts of the tufted carpet product in the inward direction to entangle the second plurality of peripheral yarn tufts of the tufted carpet product comprises entangling at least one yarn tuft of the first plurality of yarn tufts with at least two other yarn tufts of the tufted carpet product.

14. The method of claim 1, wherein each peripheral yarn tuft of the first plurality of peripheral yarn tufts comprises at least one filament having a tip, wherein displacing the first plurality of peripheral yarn tufts of the tufted carpet product in the inward direction to entangle the second plurality of peripheral yarn tufts of the tufted carpet product comprises displacing the tip of each yarn tuft of the first plurality of peripheral yarn tufts by a select distance, wherein the select distance ranges from about 0.1 inch to about 1.0 inch.

15. A method comprising:

displacing a first plurality of peripheral yarn tufts of a tufted carpet product in an inward direction away from a periphery of the tufted carpet product to entangle a second plurality of peripheral yarn tufts of the tufted carpet product that are positioned inwardly of the first plurality of peripheral yarn tufts, each of the first and second plurality of peripheral yarn tufts being tufted in and extending upwardly from a top surface of a primary backing layer of the tufted carpet product, wherein entanglement of the yarn tufts of the first plurality of peripheral yarn tufts with the second plurality of peripheral yarn tufts anchors the first plurality of peripheral yarn tufts to the second plurality of peripheral yarn tufts, wherein the first plurality of peripheral yarn tufts are displaced using at least one needle that is inserted into the first peripheral yarn tufts in the inward direction.

16. The method of claim 15, wherein the at least one needle comprises a plurality of needles.

17. A method comprising:

displacing a first plurality of peripheral yarn tufts of a tufted carpet product in an inward direction so that each yarn tuft of the first plurality of yarn tufts entangles, without heat fusion, at least one other tuft of the tufted carpet product in order to anchor the first plurality of peripheral yarn tufts in a desired orientation relative to the primary backing layer, wherein each yarn tuft of the tufted carpet product is tufted in and extends upwardly from a top surface of a primary backing layer of the tufted carpet product, wherein the yarn tufts of the first plurality of peripheral yarn tufts and the second plurality of peripheral yarn tufts are mechanically secured to one another without being chemically adhered to one another, and wherein displacing the first plurality of peripheral yarn tufts of the tufted carpet product in the inward direction to entangle the second plurality of peripheral yarn tufts of the tufted carpet product comprises moving a needle in the inward direction across an edge of the primary backing layer.

* * * * *